(12) United States Patent
Zhao

(10) Patent No.: US 12,046,083 B2
(45) Date of Patent: Jul. 23, 2024

(54) INTERFACE CONVERTER AND VEHICLE DIAGNOSIS SYSTEM

(71) Applicant: AUTEL INTELLIGENT TECHNOLOGY CORP., LTD., Guangdong (CN)

(72) Inventor: Minghua Zhao, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 319 days.

(21) Appl. No.: 17/457,310

(22) Filed: Dec. 2, 2021

(65) Prior Publication Data

US 2022/0092887 A1     Mar. 24, 2022

Related U.S. Application Data

(63) Continuation of application No. PCT/CN2020/100206, filed on Jul. 3, 2020.

(30) Foreign Application Priority Data

Jul. 16, 2019    (CN) .......................... 201910641235.1

(51) Int. Cl.
    *G07C 5/00*        (2006.01)
    *G07C 5/08*        (2006.01)

(52) U.S. Cl.
    CPC ............. *G07C 5/008* (2013.01); *G07C 5/006* (2013.01); *G07C 5/0808* (2013.01)

(58) Field of Classification Search
None
See application file for complete search history.

(56) References Cited

U.S. PATENT DOCUMENTS 5,555,498 A * 9/1996 Berra .................. G06F 11/2733
                                                      701/34.3
10,763,882 B1 * 9/2020 Stone .................... B60R 16/023
(Continued)

FOREIGN PATENT DOCUMENTS

CN        201707605 U     1/2011
CN        102416914 A     4/2012
(Continued)

OTHER PUBLICATIONS

International Search Report mailed Sep. 29, 2020; PCT/CN2020/100206.

*Primary Examiner* — Henry Tsai
*Assistant Examiner* — Aurangzeb Hassan
(74) *Attorney, Agent, or Firm* — Frank Gao, Esq.

(57) ABSTRACT

An interface converter and a vehicle diagnosis system are provided. The interface converter includes a communication contact, pin contacts, and a switch switching apparatus. The pin contacts are plugged into the vehicle-mounted automatic diagnosis system interface. The communication contact is configured to connect to a vehicle diagnosis device, and the switch switching apparatus is configured to link the communication contact with any one pin contact among the pin contacts, so that signals transmitted by the vehicle diagnosis device by means of the communication contact are transmitted to a target pin contact among the pin contacts. Since the switch switching apparatus may link the communication contact to any one pin contact among the pin contacts, the interface converter can be connected to any target pin in an OBD interface of different types of vehicles, thereby increasing the adaptability and compatibility of the interface converter.

15 Claims, 5 Drawing Sheets

(56) References Cited

U.S. PATENT DOCUMENTS

| | | | | |
|---|---|---|---|---|
| 2006/0217855 | A1* | 9/2006 | Chinnadurai | G07C 5/008 |
| | | | | 701/32.7 |
| 2012/0046826 | A1* | 2/2012 | Panko | G07C 5/0858 |
| | | | | 702/81 |
| 2012/0226408 | A1* | 9/2012 | Miller | B60R 16/02 |
| | | | | 701/33.2 |
| 2014/0200760 | A1* | 7/2014 | Kaufmann | G08G 1/162 |
| | | | | 701/29.3 |
| 2015/0025736 | A1* | 1/2015 | Wu | G07C 5/085 |
| | | | | 701/33.2 |
| 2016/0035150 | A1 | 2/2016 | Barfield, Jr. et al. | |
| 2017/0084088 | A1* | 3/2017 | Reichardt | G07C 5/008 |
| 2018/0032909 | A1* | 2/2018 | Merg | G06F 11/00 |
| 2020/0118362 | A1* | 4/2020 | Debu | H04L 67/12 |
| 2020/0203906 | A1* | 6/2020 | Thürmer | G07C 5/0808 |
| 2021/0111923 | A1* | 4/2021 | Zarka | H04L 12/4015 |

FOREIGN PATENT DOCUMENTS

| | | |
|---|---|---|
| CN | 102436256 A | 5/2012 |
| CN | 102780725 A | 11/2012 |
| CN | 104050970 A | 9/2014 |
| CN | 104731082 A | 6/2015 |
| CN | 105223944 A | 1/2016 |
| CN | 108255160 A | 7/2018 |
| CN | 208077005 U | 11/2018 |
| CN | 208207233 U | 12/2018 |
| CN | 109683595 A | 4/2019 |
| JP | 2009277008 A | 11/2009 |

* cited by examiner

INTERFACE CONVERTER AND VEHICLE DIAGNOSIS SYSTEM

CROSS-REFERENCE OF RELATED APPLICATIONS

This application is a continuation application of International Application No. PCT/CN2020/100206, filed on Jul. 3, 2020, which claims priority to Chinese Patent Application No. 201910641235.1, entitled "INTERFACE CONVERTER AND VEHICLE DIAGNOSTIC SYSTEM", filed on Jul. 16, 2019 in China Patent Office, the entire contents of which are incorporated herein by reference.

TECHNICAL FIELD

This application relates to the technical field of on-board diagnosis, and in particular, to an interface converter and a vehicle diagnosis system.

RELATED ART

With the development of economic globalization and internationalization of vehicle production, On-Board Diagnostics (OBD) has been more and more widely implemented and applied in order to standardize vehicle fault diagnosis related to emission and drivability. Generally, a vehicle has a 16-pin vehicle OBD interface as a diagnostic interface corresponding to the OBD device, which allows diagnosis and programming during development and maintenance of the vehicle.

However, in implementing the present disclosure, the inventors found the following technical problems existing in the prior art: the functional pin assignment of 16-pin vehicle OBD interfaces is rather chaotic because different manufacturers have different custom configurations. The solution in the existing technologies to solve the aforementioned technical problem is to switch among limited groups of fixed pins For example: contacts 1-9 are connected to the I/O port, contacts 3-11 are connected to the I/O port, or contacts 4-16 are connected to the I/O port, while it is impossible to automatically connect any ones of the contacts to the I/O port. Therefore, the problem of low compatibility of the existing pin matching technology cannot be solved properly.

SUMMARY OF THE DISCLOSURE

In order to solve the above technical problems, the embodiments of the present disclosure provides an interface converter and a vehicle diagnosis system.

In order to solve the above technical problem, an embodiment of the present disclosure provides the following technical solution: an interface converter, applied to a vehicle-mounted automatic diagnosis system interface, the interface converter including:
  a communication contact, a plurality of pin contacts, and a switch switching apparatus;
  the plurality of pin contacts are plugged into the vehicle-mounted automatic diagnosis system interface;
  the communication contact is connected to a vehicle diagnosis device; and
  the switch switching apparatus is configured to link the communication contact with any one pin contact among the plurality of pin contacts, so that signals transmitted by the vehicle diagnosis device by means of the communication contact are transmitted to a target pin contact among the plurality of pin contacts.

Optionally, the switch switching apparatus includes a plurality of switch components in multi-stage configuration, each switch component including a movable terminal and N stationary terminals, where the movable terminal of a switch component in the first stage is connected to the communication contact, one stationary terminal of a switch component in the last stage is connected to one pin contact, and one stationary terminal of each switch component other than the switch components in the last stage is connected to the movable terminal of a switch component in the next stage; where N is a natural number greater than or equal to 2.

Optionally, the switch component is a single-pole N-throw switch.

Optionally, the single-pole N-throw switch is a relay, an optocoupler, a transistor, or a thyristor.

Optionally, the switch switching apparatus includes a plurality of switch components, the number of the switch components is equal to the number of the pin contacts, and one terminals of the plurality of switch components are connected to the communication contact while the other terminals are connected to the pin contacts.

Optionally, the switch component is a single-pole single-throw switch.

Optionally, the interface converter further includes a controller, the controller being connected to a control terminal of the switch component. At least two communication contacts and at least two switch switching apparatuses are provided, and one switch switching apparatus is configured to connect one communication contact with any one pin contact among the plurality of pin contacts.

In order to solve the above technical problem, an embodiment of the present disclosure further provides the following technical solution: a vehicle diagnostic system. The vehicle diagnostic system includes: a vehicle diagnosis device and the interface converter described above; the pin contacts of the interface converter are configured to be plugged into a vehicle-mounted automatic diagnosis system interface of a vehicle, and the communication contact of the interface converter is plugged into a diagnosis interface of the vehicle diagnosis device.

In order to solve the above technical problem, an embodiment of the present disclosure further provides the following technical solution: an interface conversion method, applied to the interface converter described above. The method includes the following steps:
  acquiring parameter information of a vehicle to be diagnosed;
  determining a target pin contact according to the parameter information; and
  controlling the switch switching apparatus to link the communication contact to the target pin contact among the plurality of pin contacts.

Optionally, the vehicle to be diagnosed includes the vehicle-mounted automatic diagnosis system interface, the vehicle-mounted automatic diagnosis system interface includes a plurality of pins in one-to-cone correspondence with the plurality of pin contacts; and
  the determining a target pin contact according to the parameter information, includes:
  determining a target pin among the plurality of pins according to the parameter information;
  determining the target pin contact according to the target pin.

Optionally, the determining a target pin among the plurality of pins according to the parameter information, includes:

acquiring preset pin definition information of the vehicle-mounted automatic diagnosis system interface corresponding to the parameter information according to the parameter information; and determining the target pin according to the preset pin definition information. Optionally, the acquiring parameter information of a vehicle to be diagnosed, includes:

scanning the plurality of pins of the vehicle-mounted automatic diagnosis system interface;

acquiring a vehicle identification number of the vehicle to be diagnosed according to a result of scanning; and acquiring the parameter information according to the vehicle identification number.

Optionally, the parameter information includes brand information, production date, vehicle model information and configuration information of the vehicle to be diagnosed.

Compared with the prior art, the interface converter provided by the embodiments of the present disclosure connects the communication contact to the vehicle diagnosis device and the pin contacts to the vehicle-mounted automatic diagnosis system interface, thereby connecting the vehicle diagnosis device to an OBD interface of a vehicle via the interface converter. Since the switch switching apparatus may link the communication contact to any one pin contact among the plurality of pin contacts, the interface converter may thus be connected to any target pin in an OBD interface of different types of vehicles, thereby increasing the adaptability and compatibility of the interface converter.

BRIEF DESCRIPTION OF THE DRAWINGS

One or more embodiments are illustrated by way of example in the figures of the accompanying drawings, and these illustrations are not to be construed as limiting the embodiments. Elements in the figures having the same reference numerals represent like elements, and unless otherwise specified, the figures in the accompanying drawings are not necessarily drawn to scale.

DETAILED DESCRIPTION OF THE DISCLOSURE

Figure 1:
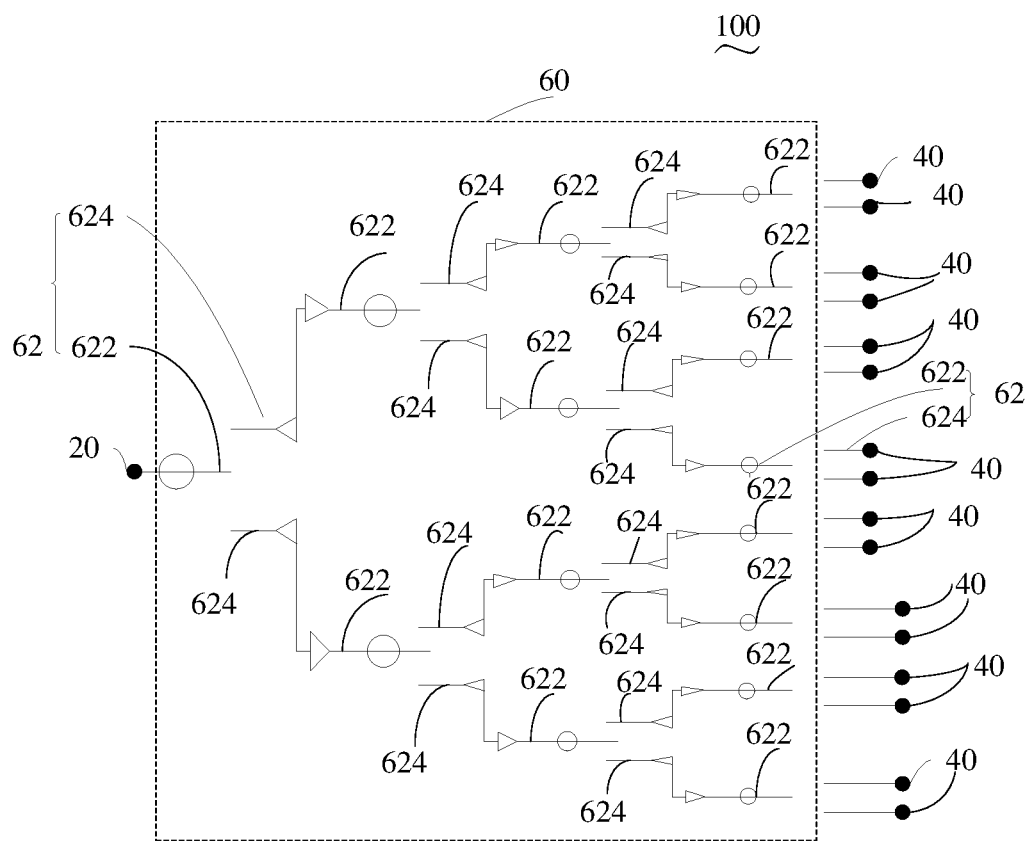
FIG. 1 shows a schematic diagram of an interface converter according to an embodiment of the present disclosure.

To facilitate understanding, the present disclosure will be described in more detail below with reference to the accompanying drawings and specific embodiments. It should be noted that that when an element is referred to as being "secured" to another element, it may be directly on the other element or intervening elements may be present. When an element is referred to as being "connected" to another element, it may be directly connected to the other element or intervening elements may be present. As used herein, the terms "upper", "lower", "inner", "outer", "bottom", and the like indicate orientations or positional relationships based on the orientation or positional relationships shown in the figures, which are merely for convenience and simplification in describing the present disclosure, and do not indicate or imply that the devices or elements referred to must have a particular orientation or be constructed and operated in a particular orientation, and thus are not to be construed as limiting the present disclosure. Furthermore, the terms "first", "second", "third", and the like are used for descriptive purposes only and are not to be construed as indicating or implying relative importance.

Unless defined otherwise, all technical and scientific terms used herein have the same meaning as commonly understood by those of ordinary skill in the art to which this disclosure belongs. The terminology used herein is for the purpose of describing particular embodiments only and is not intended to be limiting of the present disclosure. As used herein, the term "and/or" includes any and all combinations of one or more of the associated listed items.

Furthermore, the features of various embodiments of the present disclosure described below can be combined as long as they do not conflict with each other.

Before describing an interface converter applied to an OBD (On-Board Diagnostic System) interface and a vehicle diagnosis system as provided by the present disclosure, firstly, application scenarios involved in the embodiments of the present disclosure will be introduced.

A schematic diagram illustrating an application environment for a vehicle diagnosis system provided by the embodiments of the present disclosure is provided. The application scenarios include a vehicle, an OBD interface, an interface converter, and an vehicle diagnosis device. The OBD interface is provided on the vehicle, one terminal of the interface converter is plugged into the OBD interface, while the other terminal of the interface converter is connected to the vehicle diagnosis device. In this application scenario, when operations such as emission detection, drivability related fault diagnosis and maintenance are to be conducted on a vehicle, the vehicle diagnosis device is connected to the OBD interface of the vehicle via the interface converter, thereby enabling the vehicle diagnosis device to diagnose and program the vehicle via the OBD interface.

OBD (On-Board Diagnostic System) is an "vehicle-mounted diagnosis system", which may also be called on-board diagnosis. It is a standard specification for vehicle self-diagnosis systems proposed by the Society of Automotive Engineers. The interface converter is plugged into the OBD interface of the vehicle, by which vehicle data about various systems and components of the vehicle, including the engine, catalytic converter, particulate trap, oxygen sensor, emission control system, fuel system, etc., may be monitored and acquired.

Among others, the vehicle may be an automobile of any type, not limited to a traditional automobile, a pure electric automobile or a hybrid automobile, but may also be other types of motor vehicles having an OBD interface.

Figure 2:
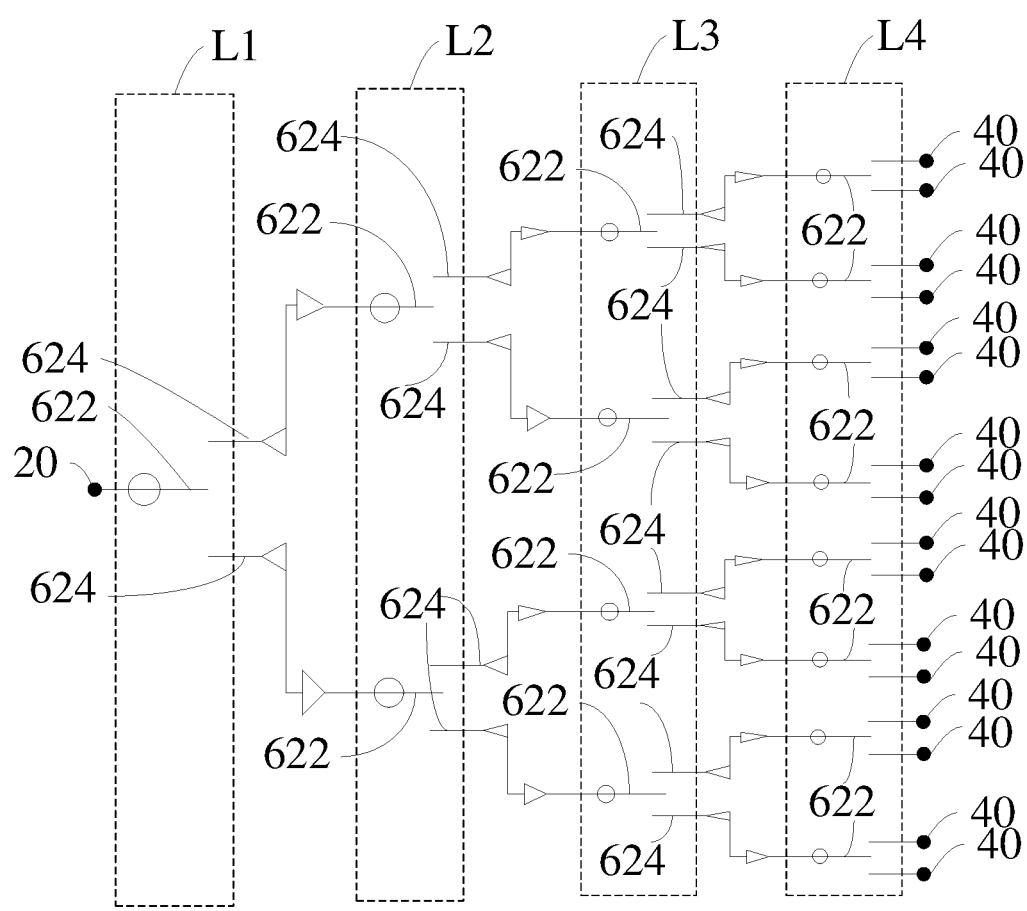
FIG. 2 shows a schematic diagram of an interface converter according to another embodiment of the present disclosure.

Referring to FIGS. 1 and 2, an embodiment of the present disclosure provides an interface converter 100, including a communication contact 20, a plurality of pin contacts 40, and a switch switching apparatus 60.

In order to connect the vehicle diagnosis device to the OBD interface of the vehicle via the interface converter 100 for diagnosis and programming of the vehicle, the communication contact 20 is connected to the vehicle diagnosis device, and the pin contacts 40 are plugged into the vehicle-mounted automatic diagnosis system interface. In this way, the vehicle diagnosis device is connected to the OBD interface of the vehicle via the interface converter 100 and is enabled to acquire diagnostic information monitored by the vehicle-mounted automatic diagnosis system interface via the communication contacts 20 for later diagnosis and programming.

According to OBD standards, an OBD interface is a 16-pin diagnosis interface. In particular implementation, the OBD interface needs to be adjusted according to different functions to be provided. For example, at present, the 6th and 14th pins are to be used for the diagnosis and programming of CAN channels according to OBD interface standardization. However, because different automobile manufacturers have different custom configurations, the functional pin assignment of 16-pin vehicle OBD interfaces is rather chaotic.

In order to solve the above technical problem, any one of the pin contacts 40 may be connected to a corresponding pin of the OBD interface, and in this embodiment, the switch switching apparatus 60 is provided and used to link the communication contact 20 to any one pin contact 40 among the plurality of pin contacts 40.

In this embodiment, the interface converter 100 with the communication contact 20 is connected to the vehicle diagnosis device, and the pin contacts 40 is connected to the vehicle-mounted automatic diagnosis system interface, so that the vehicle diagnosis device is connected to the OBD interface of the vehicle. Since the switch switching apparatus 60 links the communication contact 20 to any one pin contact 40 among the plurality of pin contacts 40, signals transmitted by the vehicle diagnosis device via the communication contact 20 can be transmitted to a target pin contact among the plurality of pin contacts according to different functions to be provided. As the plurality of pins of the OBD interface are in one-to-one correspondence to the plurality of pin contacts of the interface converter, the vehicle diagnosis device may thus be connected to any target pin in an OBD interface of different types of vehicles via the interface converter 100, thereby improving the compatibility and adaptability of the interface converter 100.

In order to enable the switch switching apparatus 60 to link the communication contact 20 to any one pin contact 40 among the plurality of pin contacts 40, in this embodiment, the switch switching apparatus 60 includes a plurality of switch components 62 in multi-stage configuration. Each switch component 62 includes a movable terminal 622 and N stationary terminals 624, where the movable terminal 622 of a switch component 62 in the first stage is connected to the communication contact 20, one stationary terminal 624 of a switch component 62 in the last stage is connected to one pin contact 40, and one stationary terminal 624 of each switch component 62 other than the switch components 62 in the last stage is connected to the movable terminal 622 of a switch component 62 in the next stage, where N is a natural number greater than or equal to 2.

In this embodiment, the switch component 62 in the previous stage may be switched to connect to a plurality of switch components 62 in the next stage, and the communication contact 20 may be connected to any one stationary terminal 624 of a plurality of switch components 62 in the last stage via the switch component 62 in the first stage. Meanwhile, a plurality of stationary terminals 624 of the plurality of switch components 62 in the last stage are in one-to-one correspondence to the plurality of pin contacts 40, and each stationary terminal 624 is connected to one corresponding pin contact 40. In this way, the switch switching apparatus 60 may link the communication contact 20 to any one pin contact 40 among the plurality of pin contacts 40. In practical applications, according to different functions to be provided, the vehicle diagnosis device may be connected to any target pin of an OBD interface of different types of vehicles via the pin contacts 40 of the interface converter 100, thereby improving the compatibility and adaptability of the interface converter 100.

Referring to FIGS. 1 and 2, in order to adapt to a 16-pin OBD interface as a diagnosis interface, in some embodiments, the plurality of switch components 62 of the switch switching apparatus 60 are divided into four stages, and the plurality of switch components 62 are arranged in multi-stage configuration. Specifically, one switch component 62 is arranged in the first stage L1, two switch components 62 are arranged in the second stage L2, four switch components 62 are arranged in the third stage L3, and eight switch components 62 are arranged in the fourth stage LA.

Each switch component 62 includes a movable terminal 622 and two stationary terminals 624, in which the movable terminal 622 of each switch component 62 may be switched to connect to any one of the two stationary terminals 624, and one stationary terminal 624 of each switch component 62 is connected to the movable terminal 622 of a switch component 62 in the next stage. Specifically, the two stationary terminals 624 of the switch component 62 in the first stage L1 are connected to the movable terminals 622 of the two switch components 62 in the second stage L2, respectively; the four stationary terminals 624 of the two switch components 62 in the second stage L2 are connected to the movable terminals 622 of the four switch components 62 in the third stage L3, respectively; and the eight stationary terminals 624 of the four switch components 62 in the third stage L3 are connected to the movable terminals 622 of the eight switch components 62 in the fourth stage L4, respectively.

The switch component 62 in the first stage L1 includes one movable terminal 622, and the movable terminal 622 of the switch component 62 in the first stage L1 is connected to the communication contact 20.

The switch components 62 in the fourth stage LA include 16 stationary terminals 624, and the 16 stationary terminals 624 are in one-to-one correspondence with the 16 pins of the OBD interface with each stationary terminal 624 connected to one corresponding pin.

In this embodiment, the movable terminal 622 of the switch component 62 in the first stage L1 is connected to the communication contact 20; the switch component 62 in the first stage L1 may switch to control the two switch components 62 in the second stage L2; the switch components 62 in the two second stage L2 may switch to control the four switch components 62 in the third stage L3; and the switch components 62 in the four third stage L3 may switch to control the eight switch components 62 in the fourth stage L4. In this way, the communication contact 20 may be connected to any one stationary terminal 624 among the 16 stationary terminals 624 of the switch components 62 in the fourth stage LA via the switch component 62 in the first stage L1, the switch components 62 in the second stage L2, the switch components 62 in the third stage L3 and the switch components 62 in the fourth stage LA, and the communication contact 20 is in turn connected to any one pin contact 40 among the 16 pin contacts 40, and is further connected to any one pin among the 16 pins of the OBD interface via the pin contacts 40. Thus, the vehicle diagnosis device may be connected to any target pin of an OBD interface of different types of vehicles via the pin contacts 40 of the interface converter 100, thereby improving the compatibility and adaptability of the interface converter 100.

The switch component 62 is a single-pole N-throw switch. The single-pole N-throw switch is a relay, an optocoupler, a transistor, or a thyristor.

In order to reduce the number of the switch components 62 of the interface converter 100 and simplify the connection of the switch components 62 in different stages, the switch components 62 may be single-pole 3-throw switches, single-pole 4-throw switches, single-pole 5-throw switches, single-pole 6-throw switches, etc.

For example, in a case where the switch components 62 are single-pole 4-throw switches, in order to adapt to a 16-pin OBD interface as a diagnosis interface, the plurality of switch components 62 of the switch switching apparatus 60 are divided into 2 stages. Specifically, one switch component 62 is arranged in the first stage L1, while four switch components 62 are arranged in the second stage L2.

Each switch component 62 includes a movable terminal 622 and four stationary terminals 624, in which the movable terminal 622 of each switch component 62 may be switched to connect to any one of the four stationary terminals 624, and one stationary terminal 624 of each switch component 62 is connected to the movable terminal 622 of a switch component 62 in the next stage. Specifically, the four stationary terminals 624 of the switch component 62 in the first stage L1 are connected to the movable terminals 622 of the four switch components 62 in the second stage L2, respectively.

The switch component 62 in the first stage L1 includes one movable terminal 622, and the movable terminal 622 of the switch component 62 in the first stage L1 is connected to the communication contact 20.

The switch components 62 in the last stage include 16 stationary terminals 624, and the 16 stationary terminals 624 are in one-to-one correspondence with the 16 pins of the OBD interface with each stationary terminal 624 connected to one corresponding pin.

In this embodiment, the movable terminal 622 of the switch component 62 in the first stage L1 is connected to the communication contact 20, and the switch component 62 in the first stage L1 may switch to control the two switch components 62 in the second stage L2. In this way, the communication contact 20 may be connected to any one stationary terminal 624 among the 16 stationary terminals 624 of the switch components 62 in the second stage L2 via the switch component 62 in the first stage L1 and the switch components 62 in the second stage L2, and the communication contact 20 is in turn connected to any one pin contact 40 among the 16 pin contacts 40, and is further connected to any one pin among the 16 pins of the OBD interface via the pin contacts 40. Thus, the vehicle diagnosis device may be connected to any target pin of an OBD interface of different types of vehicles via the pin contacts 40 of the interface converter 100, thereby improving the compatibility and adaptability of the interface converter 100.

In order to enable the switch switching apparatus 60 to link the communication contact 20 to any one pin contact 40 among the plurality of pin contacts 40, in some embodiments, the switch switching apparatus 60 includes a plurality of switch components 62, the number of the switch components 62 is equal to the number of the pin contacts 40, and one terminals of the plurality of switch components 62 are connected to the communication contact 20 while the other terminals are connected to the pin contacts 40.

Since the number of the switch components 62 is equal to the number of the pin contacts 40, each switch component 62 may be connected to one corresponding pin contact 40. In this way, the switch switching apparatus 60 may link the communication contact 20 to any one pin contact 40 among the plurality of pin contacts 40, and in practical applications, according to different functions to be provided, the vehicle diagnosis device may be connected to any target pin of an OBD interface of different types of vehicles via the pin contacts 40 of the interface converter 100, thereby improving the compatibility and adaptability of the interface converter 100.

The switch component 62 is a single-pole single-throw switch. One terminal of the single-pole single-throw switch is connected to the communication contact 20, while the other terminal is connected to the pin contact 40.

In order to adapt to a 16-pin OBD interface as a diagnosis interface, in some embodiments, 16 switch components 62 are provided, one terminal of each switch component 62 is connected to the communication contact 20, while the other terminal of each switch component 62 is connected to one corresponding pin contact 40. In this embodiment, the communication contact 20 is connected to any one pin contact 40 among the 16 pin contacts 40 via the plurality of switch components 62, and is further connected to any one pin among the 16 pins of the OBD interface via the pin contacts 40. Thus, the vehicle diagnosis device may be connected to any target pin of an OBD interface of different types of vehicles via the pin contacts 40 of the interface converter 100, thereby improving the compatibility and adaptability of the interface converter 100.

Under the current standards, the vehicle diagnosis device needs to connect to any two of the 16 pins of an OBD interface of different types of vehicles via the pin contacts 40 of the interface converter 100. For example, both system programming and data monitoring need to use the 6th and 14th pins of the OBD interface, while the bus of CAN (Controller Area Network) of the vehicle needs to connect to the 1st and 9th pins of the OBD interface, or the 3rd and 11th pins during programming and data monitoring, therefore, it needs to simultaneously connect any two of the pin contacts 40 of the interface converter 100 to two corresponding pins of the OBD interface.

Figure 3:
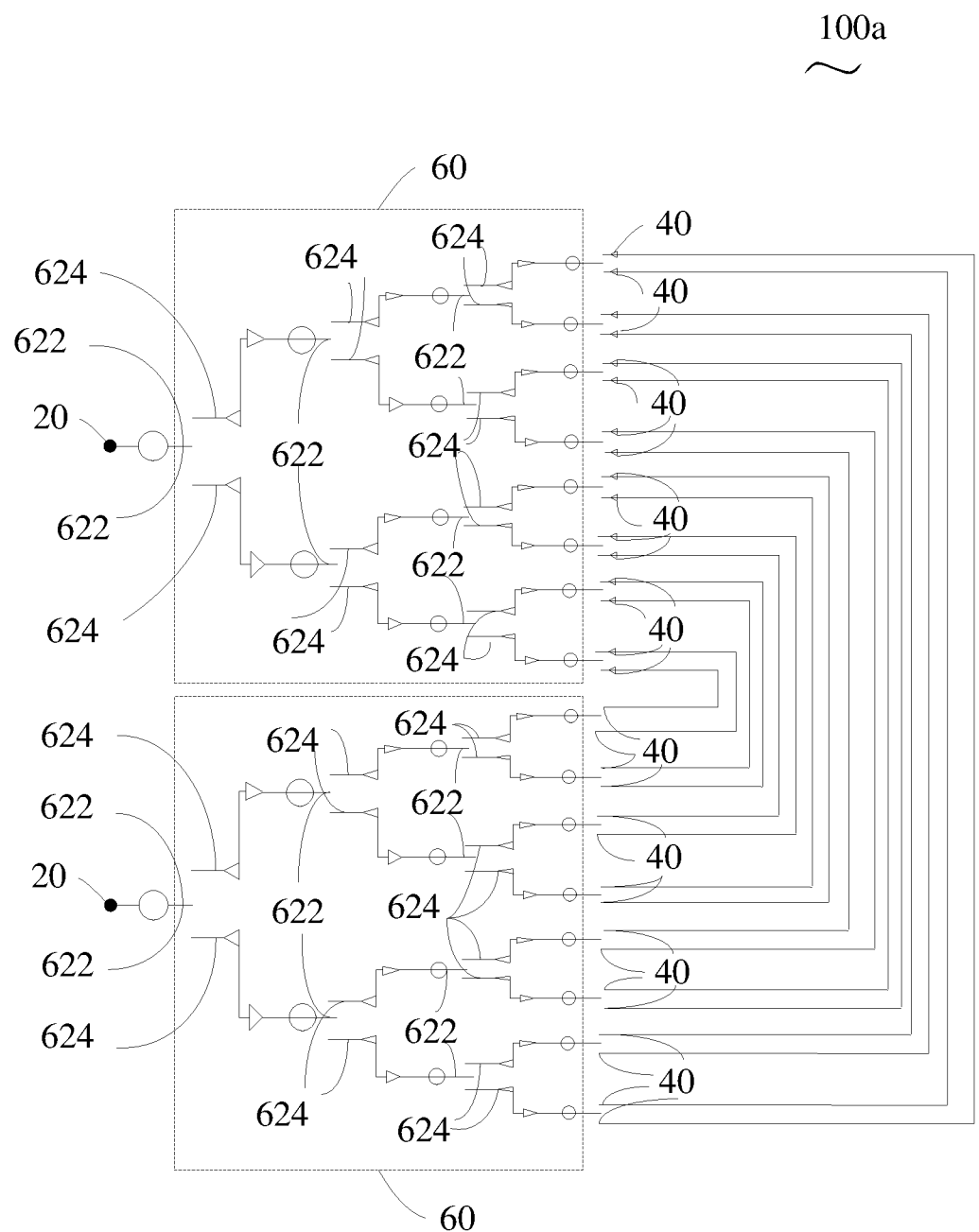
FIG. 3 shows a schematic embodiment of an interface converter according to yet another embodiment of the present disclosure.

Referring to FIG. 3, in order to enable the simultaneous connection of any two of the pin contacts 40 of the interface converter 100 to two corresponding pins of the OBD interface, the switch switching apparatus 60 and the communication contacts 20 in any of the embodiments described above may both be provided in an amount of two, one switch switching apparatus 60 is connected to one corresponding communication contact 20, and the two switch switching apparatuses 60 both may connect one communication contact 20 to any one pin contact 40 among the plurality of pin contacts 40.

For example, an interface converter 100*a* includes two switch switching apparatuses 60, one switch switching apparatus 60 is connected to one corresponding communication contact 20, each switch switching apparatus 60 includes a plurality of switch components 62 divided into four stages, and the plurality of switch components 62 of each switch switching apparatus 60 are arranged in multi-stage configuration. Specifically, for each switch switching apparatus 60, one switch component 62 is arranged in the first stage L1, two switch components 62 are arranged in the second stage L2, four switch components 62 are arranged in the third stage L3, and eight switch components 62 are arranged in the fourth stage.

Each switch component 62 includes a movable terminal 622 and two stationary terminals 624, in which the movable terminal 622 of each switch component 62 may be switched to connect to any one of the two stationary terminals 624, and one stationary terminal 624 of each switch component 62 is connected to the movable terminal 622 of a switch component 62 in the next stage. Specifically, the two stationary terminals 624 of the switch component 62 in the first stage L1 are connected to the movable terminals 622 of the two switch components 62 in the second stage L2, respectively; the four stationary terminals 624 of the two switch components 62 in the second stage L2 are connected to the movable terminals 622 of the four switch components 62 in the third stage L3, respectively; and the eight stationary terminals 624 of the four switch components 62 in the third stage L3 are connected to the movable terminals 622 of the eight switch components 62 in the fourth stage L4, respectively.

The switch component 62 in the first stage L1 of each switch switching apparatus 60 includes one movable terminal 622, and the movable terminal 622 of the switch component 62 in the first stage L1 of each switch switching apparatus 60 is connected to one corresponding communication contact 20.

The switch components 62 in the fourth stage LA of each switch switching apparatus 60 include 16 stationary terminals 624, and the 16 stationary terminals 624 of the switch assemblies 62 in the last stage of each switch switching apparatus 60 are in one-to-one correspondence with the 16 pins of the OBD interface with each stationary terminal 624 connected to one corresponding pin.

In this embodiment, since the interface converter 100a includes two switch switching apparatuses 60, each switch switching apparatus 60 may connect one corresponding communication contact 20 to any one pin contact 40 among the plurality of pin contacts 40. Each switch switching apparatus 60 is in turn connected to any one pin among the 16 pins of the OBD interface via the pin contacts 40, thereby enabling the simultaneous connection of any two pin contacts 40 of the interface converter 100a to two corresponding pins of the OBD interface. Thus, the vehicle diagnosis device may be connected to any two target pins of an OBD interface of different types of vehicles via the pin contacts 40 of the interface converter 100a, thereby improving the compatibility and adaptability of the interface converter 100a.

It will be appreciated that in order to enable the simultaneous connection of any number of pin contacts among the pin contacts 40 of the interface converter to any number of corresponding pins of the OBD interface, the switch switching apparatus 60 and the communication contacts 20 in any of the embodiments described above may both be provided in any number, one switch switching apparatus 60 is connected to one corresponding communication contact 20, and each switch switching apparatuses 60 may connect one communication contact 20 to any one pin contact 40 among the plurality of pin contacts 40.

The interface converter 100 or 100a further includes a controller, which may be a single chip microcomputer or another logic control device, and the controller is connected to a control terminal of the switch component 62. The controller controls the movable terminal 622 of the switch component 62 to switch to connect to any one of the stationary terminals 624 via the control terminal of the switch component 62. For example, when the switch component 62 is a single-pole double-throw switch, the controller may control the movable terminal 622 of the switch component 62 to switch to connect to any one of the two stationary terminals 624 via the control terminal of the switch component 62; and when the switch component 62 is a single-pole four-throw switch, the controller may control the movable terminal 622 of the switch component 62 to switch to any one of the four stationary terminals 624 via the control terminal of the switch component 62.

Figure 4:
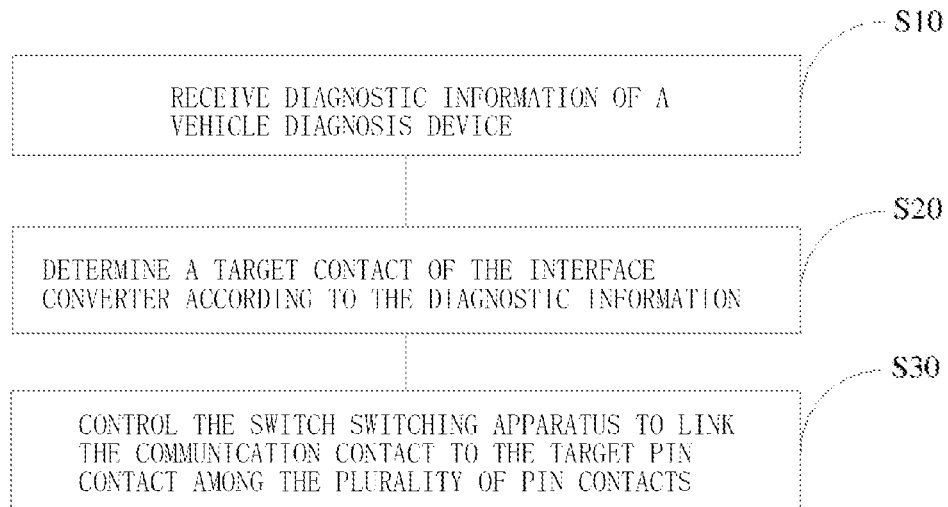
FIG. 4 shows a flowchart of an interface conversion method according to an embodiment of the present disclosure.

As another aspect of the embodiment of the present disclosure, an embodiment of the present disclosure provides an interface conversion method applied to the interface converter described in any of the above embodiments, and FIG. 4 illustrates the interface conversion method provided by the embodiment of the present disclosure. As shown in FIG. 4, the interface conversion method includes the following steps:

S10: parameter information of a vehicle to be diagnosed is acquired.

Specifically, according to OBD standards, an OBD interface is a 16-pin diagnosis interface. In particular implementation, the OBD interface needs to be adjusted according to different functions to be provided. For example, at present, the 6th and 14th pins are to be used for the diagnosis and programming of CAN channels according to OBD interface standardization. However, because different automobile manufacturers have different custom configurations, the functional pin assignment of 16-pin vehicle OBD interfaces is rather chaotic. Therefore, it is necessary to determine parameter information about the vehicle to be diagnosed before controlling the switch switching apparatus 60 to link the communication contact to a target pin contact among the plurality of pin contacts, thereby further determining a target pin of the OBD interface of the vehicle to be diagnosed according to the parameter information about the vehicle to be diagnosed. The parameter information is used to uniquely identify the vehicle to be diagnosed. The parameter information includes brand information, production date, vehicle model information, and configuration information, etc., of the vehicle to be diagnosed.

S20: a target pin contact is determined according to the parameter information.

Specifically, the functional definition of the OBD interface of the vehicle to be diagnosed may be determined according to the brand information, production date, vehicle model information and configuration information, etc., of the vehicle to be diagnosed, thereby determining the target pin to be connected of the OBD interface of the vehicle to be diagnosed according to the functional definition of the OBD interface of the vehicle to be diagnosed.

Specifically, as the plurality of pins of the OBD interface are in one-to-one correspondence with the plurality of pin contacts of the interface converter, a target pin contact of the interface converter may be determined based on the target pin to be connected of the OBD interface of the vehicle to be diagnosed.

For example, both system programming and data monitoring need to use the 6th and 14th pins, so the target pins are the 6th pin and the 14th pin, and since the plurality of pins of the OBD interface are in one-to-one correspondence with the plurality of pin contacts of the interface converter, the target pin contacts corresponding to the 6th pin and the 14th pin as the target pins are the 6th contact and the 14th contact.

S30: the switch switching apparatus is controlled to link the communication contact to the target pin contact among the plurality of pin contacts.

Figure 5:
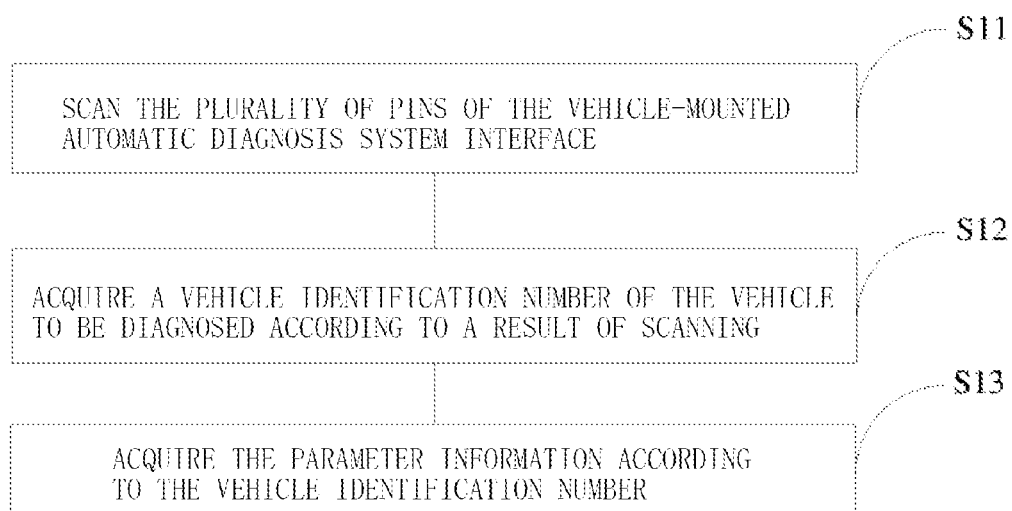
FIG. 5 shows a flowchart of an embodiment of S10 in FIG. 4.

In order to obtain the parameter information of the vehicle to be diagnosed more effectively, in some embodiments, as shown in FIG. 5, S10 includes the following steps:

S11: the plurality of pins of the vehicle-mounted automatic diagnosis system interface are scanned.

Specifically, communication connection is established with the plurality of pins of the vehicle-mounted automatic diagnosis system interface in sequence via a communication bus of the vehicle to be diagnosed.

S12: a vehicle identification number of the vehicle to be diagnosed is acquired according to a result of scanning.

Specifically, if communication connection is successfully established with a part of the plurality of pins of the vehicle-mounted automatic diagnosis system interface, the vehicle identification number of the vehicle to be diagnosed may be obtained.

The vehicle identification number, VIN for short, is unique identification information of a vehicle.

S13: the parameter information is acquired according to the vehicle identification number.

Specifically, the vehicle identification number is composed of 17 characters (including English letters and numbers), which is a set of character code assigned to a vehicle by a manufacturer for identification. Specifically, the 1st to 3rd characters of the 17 characters (WMI: World Manufacturer Identifier): indicate the manufacturer, brand and type, for unique identification of the vehicle manufacturer; the 4th to 9th characters (VDS: Vehicle Description Section): describe the general properties of the vehicle, in which the code sequence is determined by the manufacturer. For example: brand series, body type, engine type and configuration, engine displacement, safety restraint system type; the 9th character: the check bit, which is used to prevent input errors with some algorithms and also provides a certain anti-counterfeiting effect; the 10th to 17th characters (VIS: Vehicle Identifier Section): a set of characters assigned by the manufacturer to identify different vehicles, in which the last four characters should be numerals; the 10th character: model year, i.e. the model year specified by the manufacturer; the 11th character: assembly plant; and the 12th to 17th characters: production serial number of the production line.

The vehicle identification number contains information such as the manufacturer, year, model, body type and code, engine code and assembly site of the vehicle, so that the parameter information may be obtained from the vehicle identification number.

Figure 6:
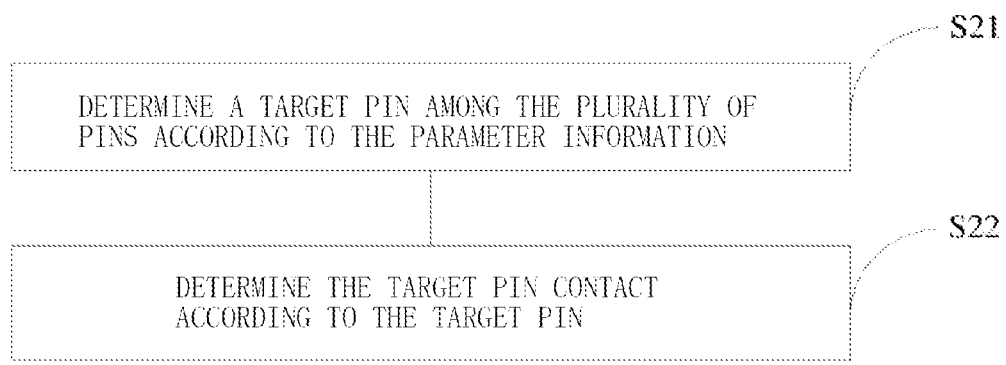
FIG. 6 shows a flowchart of an embodiment of S20 in FIG. 4.

In order to obtain the parameter information of the vehicle to be diagnosed more effectively, in some embodiments, as shown in FIG. 6, S20 includes the following steps:

S21: a target pin is determined among the plurality of pins according to the parameter information.

Specifically, different automobile manufacturers have different pin definition information for the 16-pin vehicle-mounted automatic diagnosis system interface, for example, vehicle A needs to use the 6th and 14th pins in the OBD interface pin definition for CAN diagnosis and programming, while vehicle B needs to use the 7th and 13th pins in the OBD interface pin definition for CAN diagnosis and programming. Therefore, preset pin definition information of the vehicle-mounted automatic diagnosis system interface corresponding to the parameter information is firstly acquired according to the parameter information. Then, the target pin is determined according to the preset pin definition information. For example, to perform CAN diagnosis and programming on vehicle A, firstly, preset pin definition information of vehicle A is acquired, where the preset pin definition information contains definition information that the 6th and 14th pins are used for CAN diagnosis and programming of vehicle A, and then it is determined that the 6th and 14th pins are the target pins according to the preset pin definition information.

S22: the target pin contact is determined according to the target pin.

Since the vehicle-mounted automatic diagnosis system interface includes a plurality of pins in one-to-cone correspondence with the plurality of pin contacts, the target pin contact of the interface converter may be determined from the target pin of the OBD interface of the vehicle corresponding to the fault type in the diagnostic information.

For example, both system programming and data monitoring need to use the 6th and 14th pins, so the target pins are the 6th pin and the 14th pin, and since the plurality of pins of the OBD interface are in one-to-one correspondence with the plurality of pin contacts of the interface converter, the target pin contacts corresponding to the 6th pin and the 14th pin as the target pins are the 6th contact and the 14th contact. Another embodiment of the present disclosure also provides a vehicle diagnosis system, which includes a vehicle diagnosis device and the interface converter 100 or 100a described in any of the above embodiments.

The pin contacts 40 of the interface converter 100 or 100a are used to be plugged into a vehicle-mounted automatic diagnosis system interface of a vehicle, and the communication contact 20 of the interface converter 100 or 100a is plugged into a diagnosis interface of the vehicle diagnosis device.

Compared with the prior art, the interface converter provided in the vehicle diagnosis system of the present disclosure connects the communication contact to the vehicle diagnosis device and the pin contacts to the vehicle-mounted automatic diagnosis system interface, thereby connecting the vehicle diagnosis device to an OBD interface of a vehicle via the interface converter. Since the switch switching apparatus 60 may link the communication contact to any one pin contact among the plurality of pin contacts, the interface converter may thus be connected to any target pin in an OBD interface of different types of vehicles, thereby increasing the adaptability and compatibility of the interface converter.

Finally, it should be noted that: the above embodiments are merely illustrative of the technical solution of the present disclosure, and are not limiting thereto. Combinations of features in the above embodiments or between different embodiments are also possible within the spirit of the disclosure, the steps may be implemented in any order, and many other variations of different aspects of the disclosure as described above are possible, which are not provided in detail for the sake of brevity. Although the present disclosure has been described in detail with reference to the foregoing embodiments, those skilled in the art will appreciate that: the technical solutions disclosed in the above-mentioned embodiments may still be modified or some of the technical features thereof may be replaced by equivalents; however, these modifications do not depart from the spirit and scope of the embodiments of the present disclosure.

The invention claimed is:

1. An interface converter, applied to a vehicle-mounted automatic diagnosis system interface, the interface converter comprising a communication contact, a plurality of pin contacts, and a switch switching apparatus; the plurality of pin contacts being plugged into the vehicle-mounted automatic diagnosis system interface; the communication contact being configured to connect to a vehicle diagnosis device; and the switch switching apparatus being configured to link the communication contact to any one pin contact among the plurality of pin contacts, so that signals transmitted by the vehicle diagnosis device by means of the communication contact are transmitted to a target pin contact among the plurality of pin contacts; wherein the switch: switching apparatus comprises a plurality of switch components, the number of the switch components is equal to the number of the pin contacts, and one terminals of the plurality of switch components are connected to the communication contact while the other terminals are connected to the pin contacts; wherein each of the plurality of switch components is a single-pole single-throw switch.

2. The interface converter according to claim 1, wherein the switch switching apparatus comprises a plurality of switch components in multi-stage configuration, each switch component comprising a movable terminal and N stationary terminals, wherein the movable terminal of a switch component in the first stage is connected to the communication contact, one stationary terminal of a switch component in the last stage is connected to one pin contact, and one stationary terminal of each switch component other than the switch components in the last stage is connected to the movable terminal of a switch component in the next stage; wherein N is a natural number greater than or equal to 2.

3. The interface converter according to claim 2, wherein the switch component is a single-pole N-throw switch.

4. The interface converter according to claim 3, wherein the single-pole N-throw switch is a relay, an optocoupler, a transistor, or a thyristor.

5. The interface converter according to claim 2, wherein the interface converter further comprises a controller, the controller being connected to a control terminal of the switch component.

6. The interface converter according to claim 1, wherein at least two communication contacts and at least two switch switching apparatuses are provided, and one switch switching apparatus is configured to connect one communication contact with any one pin contact among the plurality of pin contacts.

7. A vehicle diagnosis system, comprising a vehicle diagnosis device and an interface converter; the interface converter comprising a communication contact, a plurality of pin contacts, and a switch switching apparatus; the plurality of pin contacts being plugged into the vehicle-mounted automatic diagnosis system interface; the communication contact being configured to connect to a vehicle diagnosis device; the switch switching apparatus being configured to link the communication contact to any one pin contact among the plurality of pin contacts, so that signals transmitted by the vehicle diagnosis device by means of the communication contact are transmitted to a target pin contact among the plurality of pin contacts; and the pin contacts of the interface converter being configured to be plugged into a vehicle-mounted automatic diagnosis system interface of a vehicle, and the communication contact of the interface converter is plugged into a diagnosis interface of the vehicle diagnosis device; wherein the switch switching apparatus comprises a plurality of: switch components, the number of the switch component is equal to the number of the pin contacts, and one terminals of the plurality of switch components are connected to the communication contact while the other terminals are connected to the pin contacts; wherein each of the plurality of switch components is a single-pole single-throw switch.

8. The vehicle diagnosis system according to claim 7, wherein the switch switching apparatus comprises a plurality of switch components in multi-stage configuration, each switch component comprising a movable terminal and N stationary terminals, wherein the movable terminal of a switch component in the first stage is connected to the communication contact, one stationary terminal of a switch component in the last stage is connected to one pin contact, and one stationary terminal of each switch component other than the switch components in the last stage is connected to the movable terminal of a switch component in the next stage; wherein N is a natural number greater than or equal to 2.

9. The vehicle diagnosis system according to claim 8, wherein the switch component is a single-pole N-throw switch, and the single-pole N-throw switch is a relay, an optocoupler, a transistor, or a thyristor.

10. The vehicle diagnosis system according to claim 8, wherein the interface converter further comprises a controller, the controller being connected to a control terminal of the switch component.

11. The vehicle diagnosis system according to claim 7, wherein at least two communication contacts and at least two switch switching apparatuses are provided, and one switch switching apparatus is configured to connect one communication contact with any one pin contact among the plurality of pin contacts.

12. An interface conversion method, applied to an interface converter comprising a communication contact, a plurality of pin contacts, and a switch switching apparatus; the plurality of pin contacts being plugged into the vehicle-mounted automatic diagnosis system interface; the communication contact being configured to connect to a vehicle diagnosis device; the switch switching apparatus being configured to link the communication contact to any one pin contact among the plurality of pin contacts, so that signals transmitted by the vehicle diagnosis device by means of the communication contact are transmitted to a target pin contact among the plurality of pin contacts; the interface conversion method the following steps: acquiring parameter information of a vehicle to be diagnosed; determining a target pin contact according to the parameter information; and controlling the switch switching apparatus to link the communication contact to the target pin contact among the plurality of pin contacts; wherein the vehicles comprises the vehicle-mounted automatic diagnosis system interface, the vehicle-mounted automatic diagnosis system interface comprises a plurality of pins in one-to-Gone correspondence with the plurality of pin contacts; and the determining a target pin contact according to, the parameter: information, comprises: determining a target pin among the plurality of pins according to the parameter information; and determining the target pin contact according to the target pin.

13. The interface conversion method according to claim 12, wherein the determining a target pin among the plurality of pins according to the parameter information, comprises:
acquiring preset pin definition information of the vehicle-mounted automatic diagnosis system interface corresponding to the parameter information according to the parameter information; and
determining the target pin according to the preset pin definition information.

14. The interface conversion method according to claim 12, wherein the acquiring parameter information of a vehicle to be diagnosed, comprises:
scanning the plurality of pins of the vehicle-mounted automatic diagnosis system interface;
acquiring a vehicle identification number of the vehicle to be diagnosed according to a result of scanning; and
acquiring the parameter information according to the vehicle identification number.

15. The interface conversion method according to claim 14, wherein the parameter information comprises brand information, production date, vehicle model information and configuration information of the vehicle to be diagnosed.

* * * * *